United States Patent [19]

Chatham

[11] Patent Number: 5,127,293
[45] Date of Patent: Jul. 7, 1992

[54] STRIPPER PLATE RETAINING RING

[75] Inventor: Stephen K. Chatham, Rushville, N.Y.

[73] Assignee: Strippit, Inc., Akron, N.Y.

[21] Appl. No.: 558,096

[22] Filed: Jul. 26, 1990

[51] Int. Cl.⁵ .......................... B21D 45/08; B26D 7/18
[52] U.S. Cl. ........................... 83/136; 83/140;
  83/698; 29/466; 29/468; 403/319; 403/335
[58] Field of Search ................ 83/698, 136, 138, 139,
  83/140, 141, 142, 143, 684, 685, 686; 29/453,
  464, 465, 468, 469, 466; 403/319, 335, 348, 349

[56] References Cited

U.S. PATENT DOCUMENTS

| | | | |
|---|---|---|---|
| 3,079,824 | 3/1963 | Schott | 83/140 |
| 3,335,627 | 8/1967 | Smelts | 83/698 X |
| 3,540,339 | 11/1970 | Killaly | 83/140 |
| 3,935,771 | 2/1976 | Cady, Jr. | 83/140 |
| 4,041,817 | 8/1977 | Nelson | 83/139 |
| 4,113,227 | 9/1978 | Cigliano | 403/316 X |
| 4,121,893 | 10/1978 | Morissette | 403/319 X |
| 4,248,111 | 2/1981 | Wilson et al. | 83/140 |
| 4,261,237 | 4/1981 | DiDonato, Jr. et al. | 83/139 |
| 4,446,767 | 5/1984 | Wilson | 83/136 |
| 4,989,484 | 2/1991 | Johnson et al. | 83/140 |

Primary Examiner—Frank T. Yost
Assistant Examiner—Eugenia A. Jones
Attorney, Agent, or Firm—Hill, Van Santen, Steadman & Simpson

[57] ABSTRACT

A device for selectively securing a stripper plate on a punch guide assembly. The device includes an annular retaining ring adapted to retain the stripper plate on the guide assembly. A resiliently biased plunger is disposed adjacent the guide assembly, and selectively maintains the retaining ring in a predetermined rotational position relative to the guide assembly. The retaining ring includes at least one retaining surface, and the guide assembly includes at least one flange for selective engagement with the retaining surface to secure the retaining ring and guide assembly against relative axial movement. A method is disclosed including the steps of placing the stripper plate on the guide assembly, placing the retaining ring on the stripper plate, and affecting relative movement between the retaining ring and the guide assembly to cause the retaining projection to engage the flange, and the plunger to be received in a locator slot on the retaining ring.

18 Claims, 1 Drawing Sheet

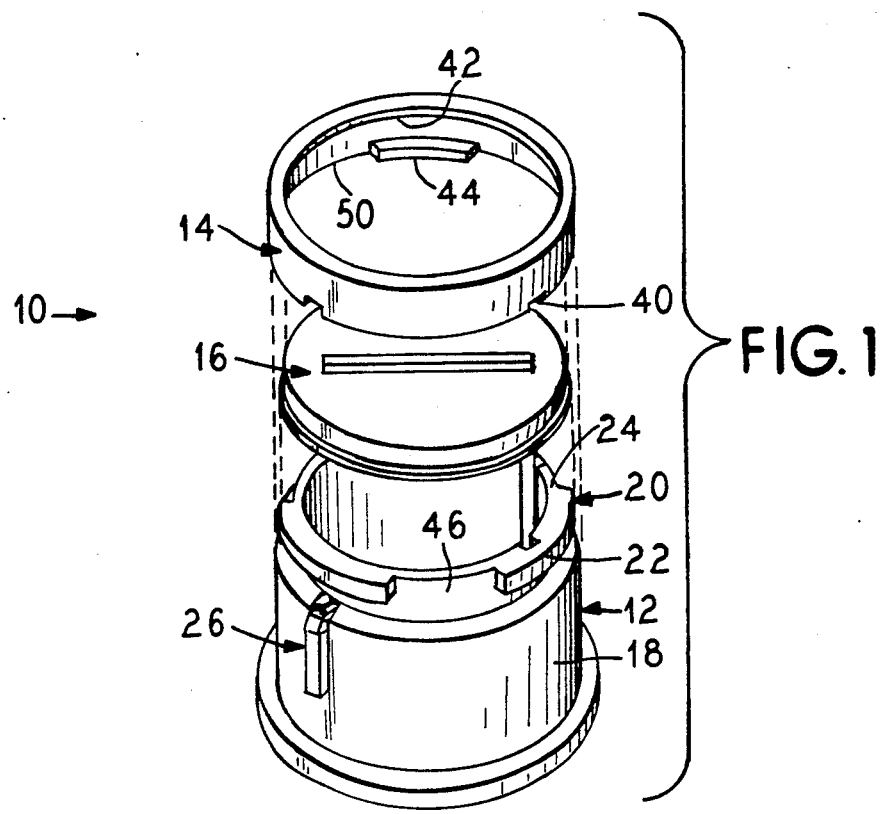
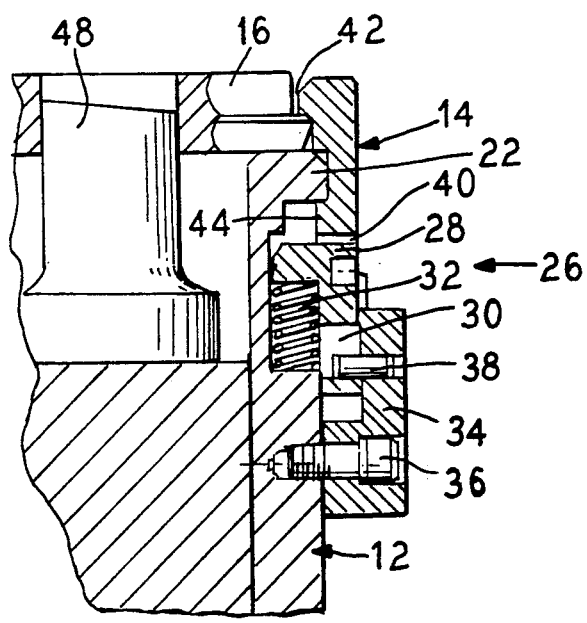

STRIPPER PLATE RETAINING RING

TECHNICAL FIELD

The present invention relates to a method and apparatus for removal and installation of a stripper plate on a punch guide assembly.

BACKGROUND OF THE INVENTION

Metal punching devices, particularly sheet metal punching devices, frequently utilize punching tools which are carried by punch guide assemblies. Stripping devices such as stripper plates are often used in association with such punching tools to ensure that punched material is stripped from the punch tip. It is desirable, in certain punching applications, to facilitate the installation and removal of different punching tools having varying shapes within a single guide assembly.

One known way of retaining a stripper plate to a guide assembly is with the use of a wire split locking ring and screw combination, as disclosed in U.S. Pat. No. 4,446,767. In this device, the operator places the stripper plate inside the guide assembly, and then compresses the split locking-ring while seating the ring in a groove inside the guide assembly. Once the ring is seated into the groove, the operator uses a wrench to install a special screw between the two ends of the locking ring. If the locking ring is not seated correctly, the ring and stripper plate are susceptible to dislodging from the guide assembly during operation of the punch, with a potential for damage to the tool and to the punching machine. In order to remove the stripper plate, the installation process is reversed.

Another known alternative is one employed by Cole Engineered Tools (C.P.E. Tooling, Inc.). This design includes a stripper plate retaining device using a machined pocket and a ball detent as a rough locator of the stripper plate. The punch is lowered into the stripper plate, and actually holds the stripper in the pocket. In this device, the punch must first be removed in order to install or remove the stripper plate. Depending on the tool design for removing the punch from the stripper plate, this usually entails at least partial disassembly of the guide assembly.

It is therefore apparent that there exists a need for a device that will provide quick and easy removal and installation of a stripper plate on a punch guide assembly, which also provides a positive locking mechanism to assure stripper plate retention during use.

SUMMARY OF THE INVENTION

The present invention provides a device and method for selectively securing a stripper plate on a punch guide assembly that obviates the shortcomings of known devices and methods. The device includes a retaining ring adapted to retain the stripper plate on the guide assembly. A resiliently biased plunger is disposed adjacent the guide assembly, and selectively maintains the retaining ring in a predetermined rotational position relative to the guide assembly. The retaining ring includes at least one locator slot that is adapted to receive the plunger. The locator slot is capable of alignment with the plunger by relative rotation between the retaining ring and the guide assembly.

The retaining ring includes at least one retaining projection, and the guide assembly includes at least one flange for selective engagement with the retaining projection surface to secure the retaining ring and the guide assembly against relative axial movement. Relative rotation between the guide assembly and the retaining ring affect engagement of the flange with the retaining projection.

The plunger can be mounted on the guide assembly by means of a key member that is secured to the guide assembly with a key pin. A dowel extends through the key member and into a longitudinal aperture in the plunger. A spring is mounted to bias the plunger toward engagement with a locator slot that extends into the retaining ring.

In one embodiment, the guide assembly is provided with three flanges, and the retaining ring is provided with three retaining projections. The flanges and retaining projections are regularly spaced at approximately 120° intervals.

Other objects and advantages of the present invention will become apparent upon reference to the accompanying description when taken in conjunction with the following drawings.

BRIEF DESCRIPTION OF THE DRAWINGS

FIG. 1 is an exploded assembly of a device embodying the present invention.

FIG. 2 is a sectional view, partially broken-away of the FIG. 1 device.

DESCRIPTION OF THE PREFERRED EMBODIMENT

FIG. 1 shows a device 10 embodying the present invention. The device includes a guide assembly 12 and a retaining ring 14, between which is secured a stripper plate 16.

The guide assembly 12 includes a generally cylindrical body 18 from which extends a cylindrical receiving portion 20. A plurality of flanges 22 are disposed at regular intervals around the outer periphery of the receiving portion 20. In the illustrated embodiment, three flanges 22 are spaced at approximately 120° about the outer periphery of the guide assembly 12. The guide assembly 12 terminates in an abutment surface 24, upon which the stripper plate 16 may be received.

A plunger assembly 26 is mounted on the guide assembly 12, and can be seen in sectional detail in FIG. 2. The plunger assembly 26 includes a plunger 28 in which is formed a longitudinally extending aperture 30. The plunger 28 is selectively reciprocable in a direction substantially parallel to a longitudinal axis of the guide assembly 12, and is biased upwardly by a spring 32. The plunger 28 is secured with respect to the guide assembly 12 by an external key member 34. The key member 34 is secured to the guide assembly 12 with a suitable fastener, such as a key pin 36. A dowel 38 extends through the key member 34 and into the aperture 30 of the plunger 28, in order to mount the plunger on the key and to define the limits of reciprocation for the plunger.

The retaining ring 14 is in the form of an annular, generally cylindrical wall. A plurality of locator slots extend axial into, and radially through, the retaining ring 14 at regular intervals. The locator slots 40 are adapted to receive the plunger 28, as will be described in detail hereinafter.

An annular lip 42 is provided along the inner periphery of the upper edge of the retaining ring 14. A plurality of retaining projections 44 extend inwardly from the lower inner peripheral edge of the retaining ring 14. The retaining projections 44 are provided at regular angular intervals corresponding to the placement of the flanges 22 on the guide assembly 12 and have widths less than the widths of spaces 46 between the flanges 22.

The method of installing the present device may be described as follows. First, the stripper plate 16 corresponding to a punch 48 is placed on the abutment surface 24 of the guide assembly 12. Next, the retaining ring 14 is placed over the stripper plate 16, with the retaining projections 44 passing through the spaces 46 between the flanges 22. Such placement causes a lower surface 50 of the retaining ring 14 to depress the plunger 28.

Next, relative rotation is affected between the retaining ring 14 and the guide assembly 12, causing the retaining projections 44 to slide beneath, and into engagement with, the flanges 22. Relative rotation is continued until one of the locator slots 40 is positioned above the plunger 28, at which time the biasing force of the spring 32 forces the plunger 28 into the locator slot 40.

In its installed position, the stripper plate 16 is secured between the annular lip 42 of the retaining ring 14 and the abutment surface 24 of the guide assembly 12. Engagement between the retaining projections 44 and the flanges 22 prevents relative axial movement of the retaining ring 14 and the guide assembly 12. Relative rotational movement between the guide assembly 12 and the retaining ring 14 is prevented when the plunger 28 is received in one of the locator slots 40.

In order to remove the stripping plate from the assembly, the plunger 28 is manually actuated to a position out of the locator slot in which it is received, and the retaining ring and guide assembly are rotated to bring the retaining projections out of engagement with the flanges. At this point, the retaining ring 14 may be lifted off of the stripper plate 16, and the stripper plate may be removed from the guide assembly.

Although the present invention has been described with reference to a specific embodiment, those of skill in the art will recognize that changes may be made thereto without departing from the scope and spirit of the invention as set forth in the appended claims.

I claim as my invention:

1. A device for selectively securing a stripper plate on a punch guide assembly, said device comprising:
    retaining ring means for retaining said stripper plate on said guide assembly;
    resiliently biased plunger means, disposed adjacent said guide assembly, for selectively maintaining said retaining ring means in a predetermined rotational position relative to said guide assembly, said plunger means being reciprocable in a direction substantially parallel to a longitudinal axis of said guide assembly; and
    at least one locator slot extending into a surface of said retaining ring means, said locator slot being adapted to receive said plunger means when said locator slot is aligned with said plunger means by relative rotation between said retaining ring means and said guide assembly;
    whereby engagement of said plunger means in said locator slot prevents relative rotation of said guide assembly with respect to said retaining ring means.

2. A device according to claim 1, wherein said plunger means is manually actuable.

3. A device according to claim 1, wherein:
    said retaining ring means comprises at least one retaining surface; and
    said guide assembly comprises at least one flange means for selective engagement with said at least one retaining surface to secure said retaining ring means and said guide assembly against relative axial movement.

4. A device according to claim 3, wherein said guide assembly and said retaining ring means are mounted for relative rotation to affect engagement of said at least one flange means with said at least one retaining surface.

5. A device according to claim 1, further comprising key means for securing said plunger means with respect to said guide assembly.

6. A device according to claim 5, further comprising dowel means for mounting said plunger means on said key means.

7. A device according to claim 6, further comprising key pin means for securing said key means on said guide assembly.

8. A device for selectively securing a stripper plate on a punch guide assembly, said device comprising:
    a retaining ring adapted to retain said stripper plate on said guide assembly and including a locator slot; and
    a resiliently biased plunger assembly disposed adjacent said guide assembly and capable of selective engagement with said locator slot to maintain said retaining ring in a predetermined rotational position relative to said guide assembly;
    said plunger assembly being reciprocable in a direction substantially parallel to a longitudinal axis of said guide assembly;
    whereby engagement of said plunger assembly in said locator slot prevents relative rotation of said guide assembly with respect to said retaining ring.

9. A device according to claim 8, wherein said retaining ring comprises an annular, generally cylindrical wall, and said locator slot extends axially into and radially through said wall.

10. A device for selectively securing a stripper plate on a punch guide assembly, said device comprising:
    an annular retaining ring including an annular lip, at least one retaining projection, and at least one locator slot;
    at least one flange disposed on said guide assembly and adapted to cooperate with said annular lip and said at least one retaining projection of said retaining ring to secure said stripper plate against axial movement relative to said guide assembly; and
    a plunger assembly disposed on said guide assembly and capable of selective engagement with said at least one locator slot to maintain said retaining ring in a predetermined rotational position relative to said guide assembly;
    whereby engagement of said plunger assembly in said locator slot prevents relative rotation of said guide assembly with respect to said retaining ring.

11. A device according to claim 10, wherein said plunger assembly comprises the following:
    a key member secured to said guide assembly;
    a reciprocable plunger mounted between said key member and said guide assembly and capable of engagement with said at least one locator slot; and
    a spring mounted to bias said plunger toward engagement with said at least one locator slot.

12. A device according to claim 11, wherein said plunger includes a longitudinal aperture open toward said key member, and said key member includes a dowel extending into said longitudinal aperture.

13. A device according to claim 12, wherein said key member is secured to said guide assembly with a key pin.

14. A device according to claim 10, wherein said at least one flange of said guide assembly comprises a plurality of flanges disposed at regular intervals around an outer periphery of said guide assembly, and wherein said at least one retaining projection of said retaining ring comprises a plurality of retaining projections disposed at regular intervals around an outer periphery of said retaining ring.

15. A device according to claim 14, wherein said plurality of flanges are disposed at approximately 120° intervals around said outer periphery of said guide assembly, and wherein said plurality of retaining projections are disposed at approximately 120° intervals around said outer periphery of said retaining ring.

16. A method of securing a stripper plate to a punch guide assembly, said method comprising the following steps:
providing said guide assembly with at least one flange and a reciprocable plunger;
providing a retaining ring having at least one retaining projection engageable with said at least one flange, and at least one locator slot adapted to receive said plunger;
placing said stripper plate on said guide assembly;
placing said retaining ring on said stripper plate; and
affecting relative movement between said retaining ring and said guide assembly to cause said at least one retaining projection to engage said at least one flange, and said plunger to be received in said at least one locator slot;
whereby, when said plunger is received in said at least one locator slot, relative rotation of said guide assembly with respect to said retaining ring is prevented.

17. A method according to claim 16, wherein said step of affecting relative movement between said retaining ring and said guide assembly comprises affecting relative rotational movement between said retaining ring and said guide assembly.

18. A method of securing a stripping plate to a punch guide assembly, and of removing a stripping plate from a punch guide assembly, said method comprising the following steps:
providing said guide assembly with at least one flange and a selectively actuable reciprocable plunger;
providing a retaining ring having at least one retaining projection engageable with said at least one flange, and at least one locator slot adapted to receive said plunger;
placing said stripper plate on said guide assembly;
placing said retaining ring on said stripper plate;
affecting a first relative movement between said retaining ring and said guide assembly to cause said at least one retaining projection to engage said at least one flange, and said plunger to be received in said at least one locator slot, whereby, when said plunger is received in said at least one locator slot, relative rotation of said guide assembly with respect to said retaining ring is prevented;
actuating said plunger to a position out of said at least one locator slot;
affecting a second relative movement between said retaining ring and said guide assembly to cause said at least one retaining projection to disengage said at least one flange;
removing said retaining ring from said stripper plate; and
removing said stripper plate from said guide assembly.

* * * * *